US008405774B2

(12) United States Patent
Hori et al.

(10) Patent No.: US 8,405,774 B2
(45) Date of Patent: Mar. 26, 2013

(54) SYNCHRONIZATION SIGNAL CONTROL CIRCUIT AND DISPLAY APPARATUS

(75) Inventors: Yasuhiro Hori, Tokyo (JP); Koichi Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 331 days.

(21) Appl. No.: 12/858,512

(22) Filed: Aug. 18, 2010

(65) Prior Publication Data

US 2011/0007215 A1 Jan. 13, 2011

(30) Foreign Application Priority Data

Sep. 7, 2009 (JP) ................................ 2009-206319

(51) Int. Cl.
*H04N 9/475* (2006.01)

(52) U.S. Cl. ........ 348/516; 348/510; 348/536; 348/512; 348/547

(58) Field of Classification Search .................. 348/500, 348/510, 512, 516, 521, 524, 547, 536, 739
See application file for complete search history.

(56) References Cited

U.S. PATENT DOCUMENTS 5,294,983 A 3/1994 Ersoz et al.
5,299,007 A 3/1994 Saeger et al.
6,229,573 B1 5/2001 Sato et al.
2002/0041335 A1* 4/2002 Taraci et al. .................. 348/511
2009/0284654 A1 11/2009 Hori et al.

FOREIGN PATENT DOCUMENTS

JP 11-331638 11/1999
JP 2005-027195 A 1/2005

OTHER PUBLICATIONS

Office Action mailed Feb. 21, 2012 by Japanese Patent Office for Japanese Patent Application No. 2009-206319, 2 pages.

* cited by examiner

*Primary Examiner* — Jeffrey Harold
*Assistant Examiner* — Jean W Desir
(74) *Attorney, Agent, or Firm* — Sprinkle IP Law Group

(57) ABSTRACT

A synchronization signal control circuit according to embodiments includes a phase difference detecting section and a vertical synchronization correction control section. When a vertical synchronization period of an input video signal is within a compensation period range between a minimum vertical synchronization period and a maximum vertical synchronization period, the synchronization signal control circuit outputs a display vertical synchronization signal used for displaying the input video signal to a display section capable of providing a display based on the input video signal. The phase difference detecting section detects a phase difference between an input vertical synchronization signal based on the input video signal and the display vertical synchronization signal. The vertical synchronization correction control section corrects the cycle period of the display vertical synchronization signal within the compensation period range so as to reduce the phase difference.

16 Claims, 6 Drawing Sheets

SYNCHRONIZATION SIGNAL CONTROL CIRCUIT AND DISPLAY APPARATUS

CROSS-REFERENCE TO RELATED APPLICATION(S)

This application is based upon and claims the benefit of priority from Japanese Patent Application No. 2009-206319 filed on Sep. 7, 2009; the entire contents of which are incorporated herein by reference.

FIELD

Embodiments described herein relate generally to a synchronization signal control circuit and a display apparatus.

BACKGROUND

Flat panel displays (hereinafter abbreviated as FPDs) such as liquid-crystal and plasma display panels are being commonly used as display apparatuses. Video signals (pixel signals), each corresponding to a single pixel, are provided to an FPD to display images. Specifically, video signals to be provided to the FPD are temporarily held in a display memory and the FPD reads pixel signals corresponding to pixels of the FPD from the display memory and drives the pixels to display an image.

Accordingly, horizontal and vertical synchronization signals used for display on the FPD (hereinafter referred to as display horizontal and vertical synchronization signals, respectively) are generated asynchronously to horizontal and vertical synchronization signals of video signals (input video signals) provided to the FPD (hereinafter referred to as input horizontal and vertical synchronization signals).

The frequency of the display vertical synchronization signal for the FPD (hereinafter referred to as display vertical synchronization frequency) relates to the reciprocal of a cycle period of vertical synchronization signal, is determined by a display clock, a horizontal synchronization period, and a vertical synchronization period, and is a value specific to each individual display apparatus. Another value specific to each individual display apparatus is an allowable range of vertical synchronization cycle period. The provision of the range between a minimum vertical synchronization period (Vsht) and a maximum vertical synchronization period (Vlng) (hereinafter the range will be referred to as a compensation period) enables the FPD to constantly provide a display based on input video signals.

As has been described, the display vertical synchronization frequency can vary from one FPD to another and the frequency of the input vertical synchronization signal of an input video signal (hereinafter referred to as input vertical synchronization frequency) can also vary from one vide source to another. Usually, the display and input vertical synchronization frequencies are not equal to each other.

If for example the input vertical synchronization frequency is higher than the display vertical synchronization frequency, a display memory overflow can occur. To prevent an overflow, the display apparatus skips video signals of one frame and reads and uses video signals of a next frame to provide a display. On the other hand, if the input vertical synchronization frequency is lower than the display vertical synchronization frequency, a display memory underflow can occur. To prevent an underflow, the display apparatus repeats a read of video signals of one frame to repeat a display.

In this way, video signals can be skipped or repeated at certain intervals due to a difference between the input vertical synchronization frequency and the display vertical synchronization frequency in the FPD, which degrades the display quality of the FPD. Furthermore, if the display vertical synchronization signal is simply synchronized to the input vertical synchronization signal, a display synchronization frequency that enables display cannot be obtained due to variations in the input vertical synchronization frequency of the same channel, input vertical frequency phase shifting or a difference between frequencies at a timing of input video signal switching at switching from one channel to another.

To address the problem, Japanese Patent Application Laid-Open Publication No. 11-331638 (hereinafter referred to as Document 1) proposes a synchronization control circuit that synchronizes a display vertical synchronization signal to an input vertical synchronization signal. In the proposal, after a start point of vertical synchronization of an input video signal falls in a compensation period allowed in a display apparatus, processing is performed to synchronize the display vertical synchronization signal to the input vertical synchronization signal, thereby preventing occurrence of skip and repeat of video signals.

However, the proposal in Document 1 has a problem that the synchronization takes relatively long time depending on a phase difference and frequency difference between the display vertical synchronization signal and the input vertical synchronization signal. An FPD may display images from a video game machine. In that case, it is desirable that a delay time between an input image and a display image be minimized. The proposal has another problem that one skip needs to be caused for synchronization.

DETAILED DESCRIPTION

A synchronization signal control circuit according to embodiments includes a phase difference detecting section and a vertical synchronization correction control section. When a vertical synchronization period of an input video signal is within a compensation period range between a minimum vertical synchronization period and a maximum vertical synchronization period, the synchronization signal control circuit outputs a display vertical synchronization signal used for displaying the input video signal to a display section capable of providing a display based on the input video signal. The phase difference detecting section detects a phase difference between an input vertical synchronization signal based on the input video signal and the display vertical synchronization signal. The vertical synchronization correction control section corrects a cycle period of the display vertical synchronization signal within the compensation period range so as to reduce the phase difference.

Embodiments of the present invention will be described below in detail with reference to drawings.

(First Embodiment)

Figure 1:
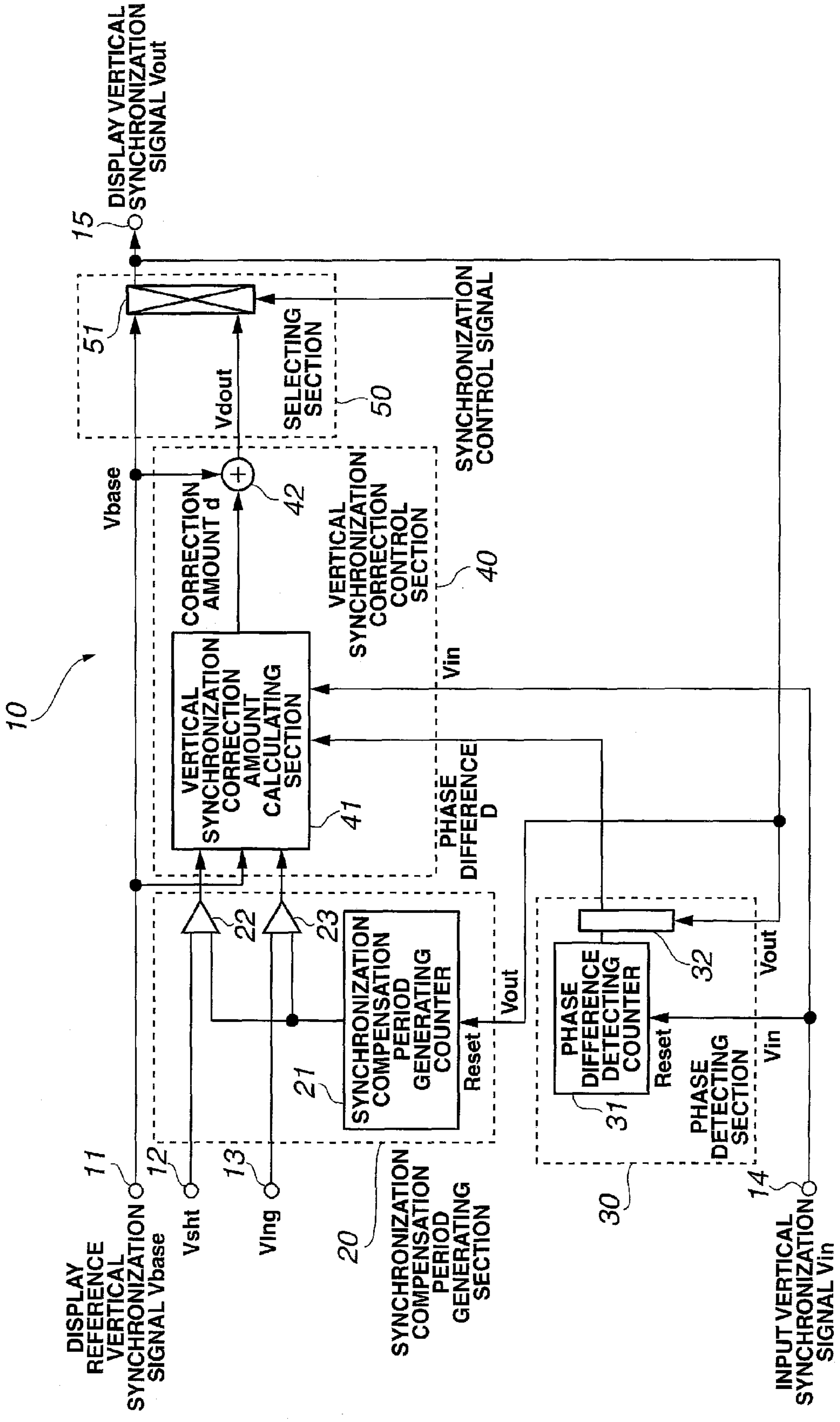
FIG. 1 is a block diagram illustrating a synchronization signal control circuit according to a first embodiment of the present invention.
Figure 2:
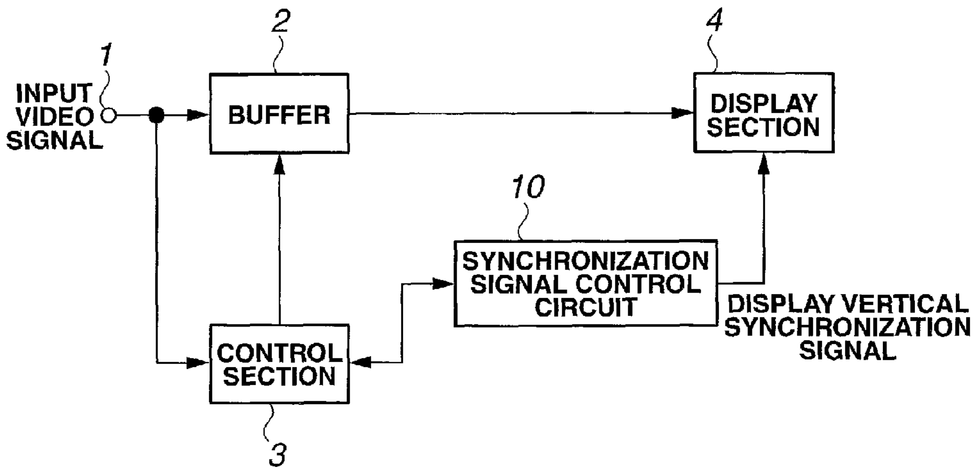
FIG. 2 is a block diagram illustrating a display apparatus incorporating the synchronization signal control circuit according to the first embodiment.

FIG. 1 is a block diagram illustrating a synchronization signal control circuit according to a first embodiment of the present invention. FIG. 2 is a block diagram illustrating a display apparatus incorporating the synchronization signal control circuit according to the first embodiment.

FIG. 1 illustrates a synchronization signal control circuit 10 used in the display apparatus in FIG. 2, which may be an FPD. The display apparatus uses a display vertical synchronization signal specific to the display apparatus to provide a display.

Figure 3:
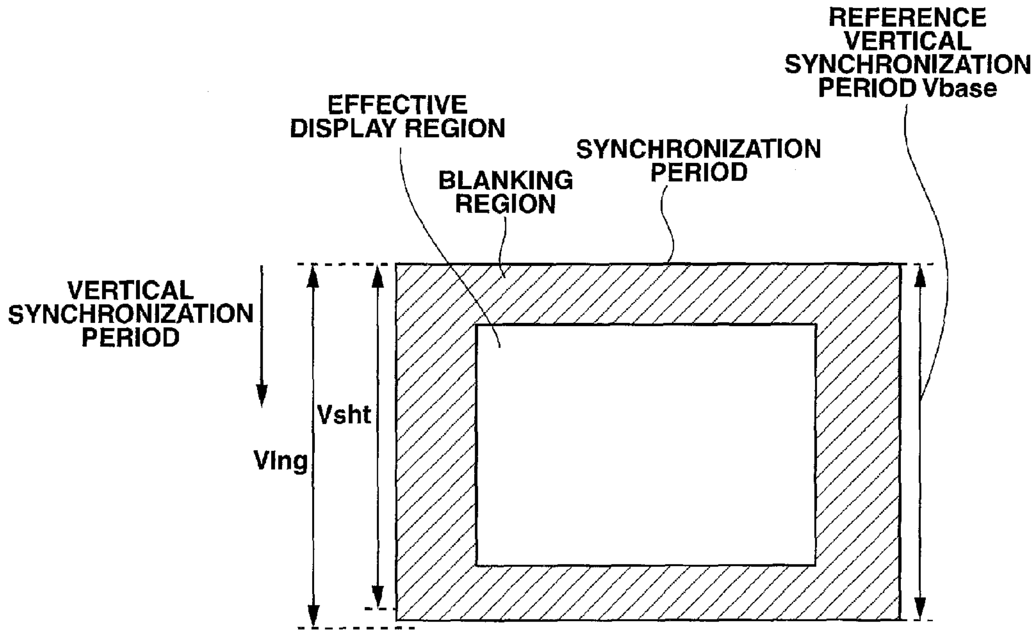
FIG. 3 is a diagram illustrating the relationship between a display screen and a synchronization period in the display apparatus in FIG. 2.
Figure 4:
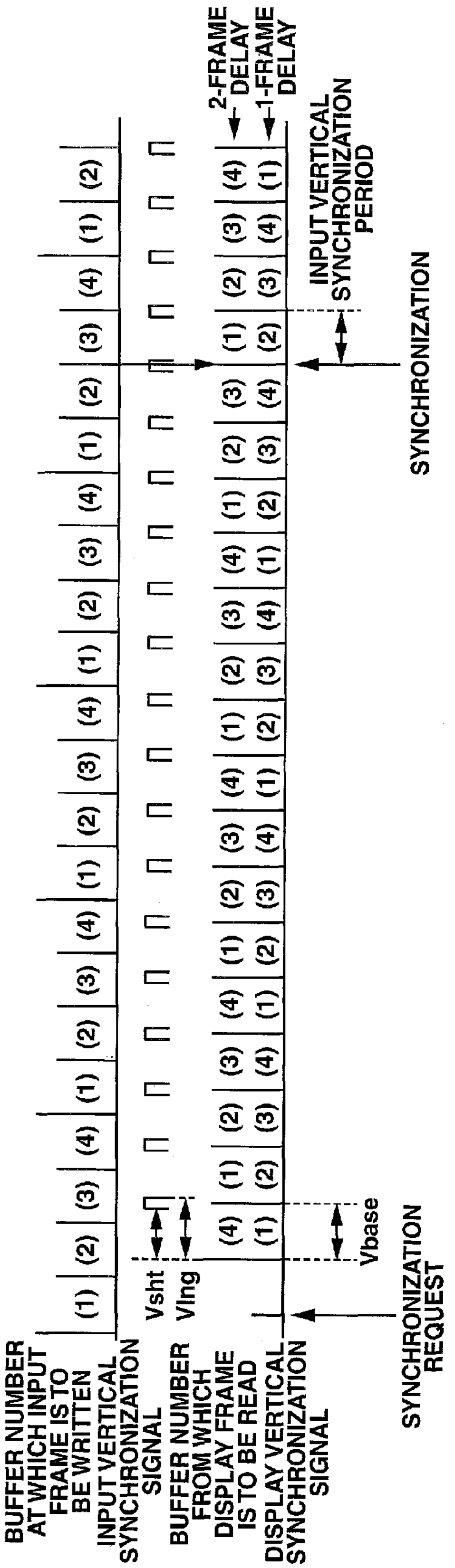
FIG. 4 is a diagram illustrating synchronization.
Figure 5:
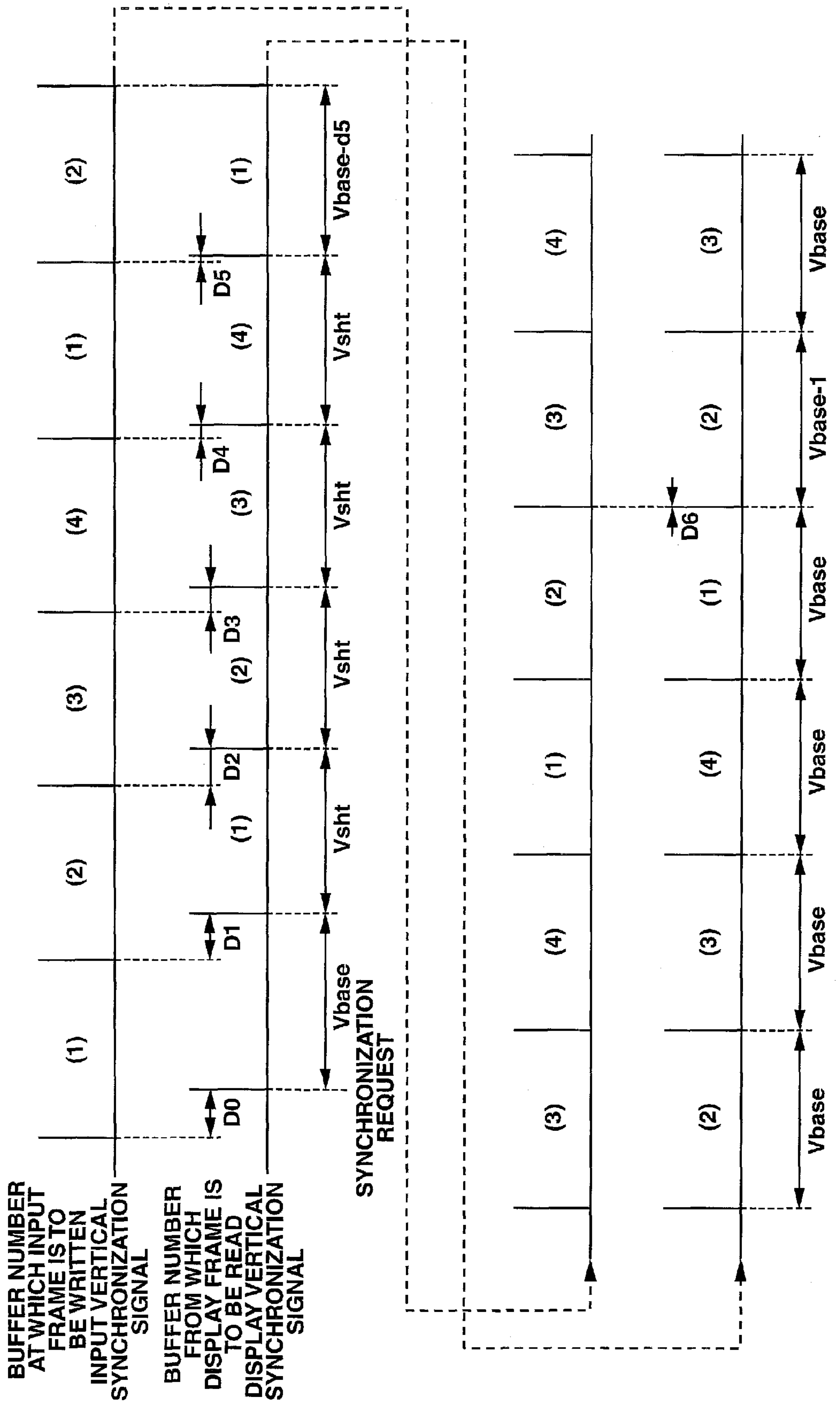
FIG. 5 is a diagram illustrating synchronization.
Figure 6:
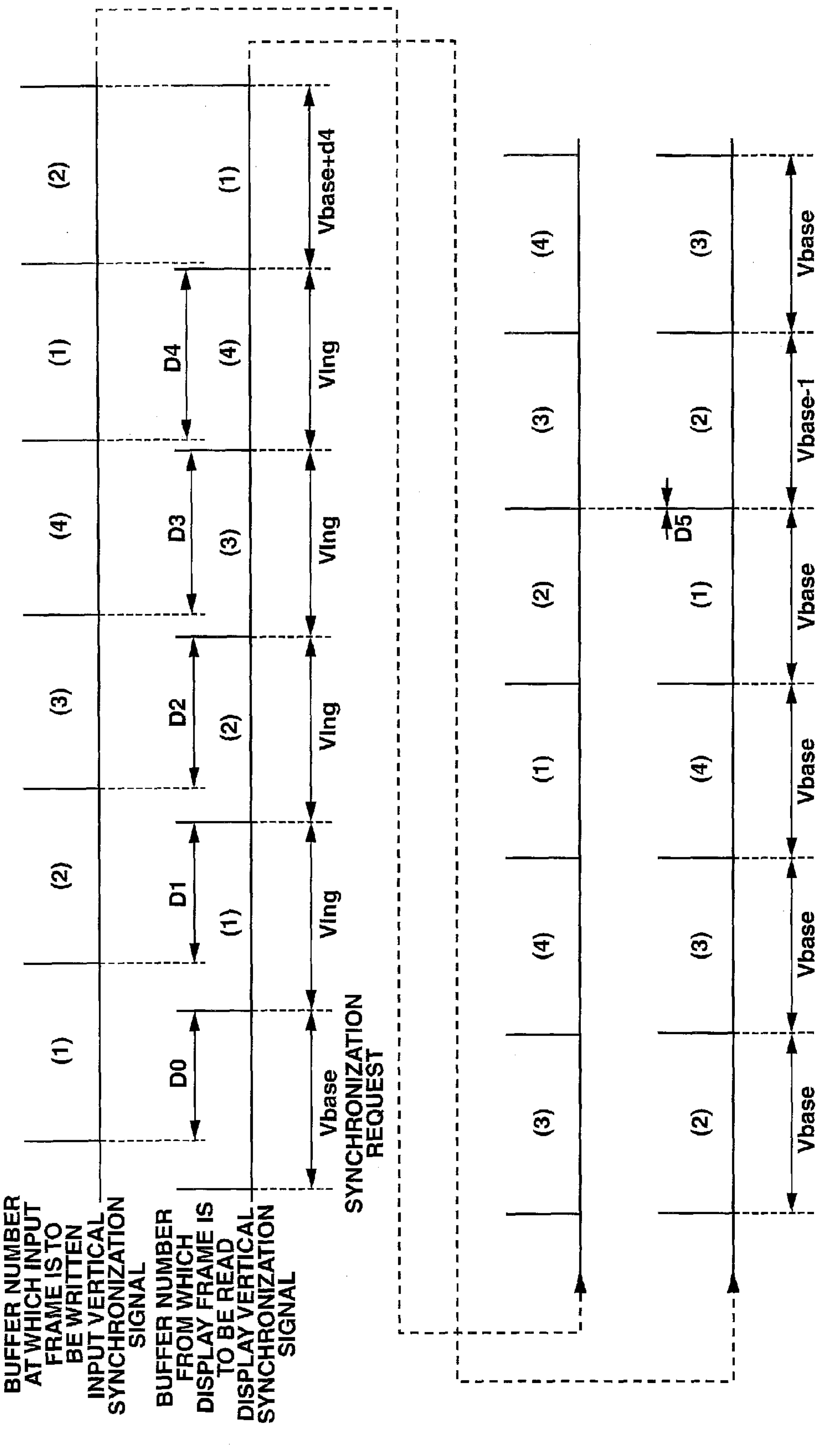
FIG. 6 is a diagram illustrating synchronization.

Referring to FIGS. 2 to 6, a synchronization method in the present embodiment will be described first. FIG. 3 is a diagram illustrating the relationship between a display screen of the display apparatus in FIG. 2 and a synchronization period. FIGS. 4 to 6 are diagrams illustrating synchronization. FIG. 4 illustrates a synchronization method described in Document 1. FIGS. 5 and 6 illustrate synchronization methods in the present embodiment.

As illustrated in FIG. 2, an input video signal input in an input terminal 1 is provided to a buffer 2 in synchronization with an input vertical synchronization signal. Write and read to and from the buffer 2 are controlled by a control section 3. The buffer 2 holds input video signals of several frames and outputs the input video signals to a display section 4. The input video signals are also provided to the control section 3. The control section 3 separates synchronization signals from the input video signals and provides the synchronization signals to a synchronization signal control circuit 10 and controls write and read to and from the buffer 2. The control section 3 provides a display reference vertical synchronization signal Vbase and the values of a minimum vertical synchronization period Vsht and a maximum vertical synchronization period Vlng, which will be described later, to the synchronization signal control circuit 10.

The synchronization signal control circuit 10 generates a display vertical synchronization signal and provides the display vertical synchronization signal to a display section 4 under the control of the control section 3. The display section 4 uses the display vertical synchronization signal to provide a display based on video signals from the buffer 2.

In FIG. 3, a vertical synchronization period in the display apparatus in FIG. 2 includes periods corresponding to an effective display region and a blanking region (the shaded portion). The vertical synchronization period is set to a cycle period of the display vertical synchronization signal. Typically, an allowable range is provided for a vertical synchronization period in which an image can be displayed on the display apparatus. Specifically, when the vertical synchronization period of an input vide signal (hereinafter referred to as input vertical synchronization period) is within a compensation period defined by the minimum vertical synchronization period Vsht and the maximum vertical synchronization period Vlng which are set before and after a reference vertical synchronization period in the display apparatus, the display apparatus can provide a display based on the input video signal.

A display vertical synchronization signal that appears in an initial state of the display apparatus is a standard vertical synchronization signal (Vbase). A vertical synchronization period based on the standard vertical synchronization signal will also be denoted as standard vertical synchronization period Vbase. Here, Vlng>Vbase>Vsht as depicted in FIG. 3.

In Document 1 described above, the synchronization method illustrated in FIG. 4 is used. The horizontal axis in FIGS. 4 to 6 is the time axis and each of the vertical lines representing the boundaries between adjacent frames indicates a start point of a vertical synchronization, that is, a vertical synchronization signal. The upper part of FIG. 4 illustrates writing of each input video signal frame into the buffer 2 and the lower part illustrates display of video signals read from the buffer 2.

Numbers in parentheses are the numbers of buffer areas in the buffer 2 that hold the input video signal frames. In the examples in FIGS. 4 to 6, video signals of frames are temporarily held in buffer areas in the buffer 2 that can hold four frames. A sequence of frames of input video signals is cyclically written in buffer regions 1 to 4 in the buffer 2.

Each of the vertical lines in the upper part of FIG. 4 represents an input vertical synchronization signals and each of the vertical lines in the lower part represents a display vertical synchronization signal, which is a vertical synchronization signal of the display apparatus. Two rows of parenthesized numbers in the lower part of FIG. 4 illustrate examples, one in which the frames held in the buffer 2 are displayed with a delay of one frame and the other in which the frames are displayed with a delay of two frames.

In the example in FIG. 4, video signals stored in the buffer area numbered 4 are displayed (with a 2-frame delay) or video signals stored in the buffer area numbered 1 are displayed (with a 1-frame delay) while input video signals are being written into the buffer area numbered 2 after a synchronization request.

The display apparatus described in Document 1 first provides a display asynchronously to input video signals in order to prevent corruption of an image due to synchronization. In this case, the display apparatus uses a display reference vertical synchronization signal (Vbase) to provide the display. The phase difference between the input vertical synchronization signal and the display reference vertical synchronization signal changes with time due to the difference between an input vertical synchronization frequency and the frequency of the display reference vertical synchronization signal (the display reference vertical synchronization frequency). In the example in FIG. 4, the input vertical synchronization frequency is higher than the display reference vertical synchronization frequency.

For synchronization to input video signals in the display apparatus, the relation Vlng>(or ≧) input vertical synchronization period>(or ≧) Vsht needs to be satisfied. As long as the relation is satisfied, the input vertical synchronization signal falls within a compensation period of the display apparatus after the lapse of time based on the frequency difference between the input vertical synchronization signal and the display vertical synchronization signal.

The compensation periods are depicted in the middle part of FIG. 4. In the invention described in Document 1, synchronization is performed when the input vertical synchronization signal falls within the compensation period. Since the input vertical synchronization signal is within the compensation period, the synchronization can be accomplished without an image corruption.

A user may display an image on the display apparatus from a video game machine. Since the user operates the video game machine while watching the image displayed on the display apparatus, it is desirable that the delay between the input of a frame into the buffer and the display of the frame be as short as possible. However, according to the invention described in Document 1, if the input vertical synchronization frequency is higher than the display reference vertical synchronization frequency, the delay time gradually increases until synchronization occurs. Therefore, preferably an action is to be performed that reduces the delay time when synchronization is performed. That is, one frame of an image needs to be skipped during synchronization as illustrated in FIG. 4 in the invention in Document 1 as well.

In the present embodiment, in contrast, an image can be smoothly displayed without an image corruption, repeat, and skip during synchronization.

The present embodiment uses a synchronization method illustrated in FIGS. 5 and 6.

Each of the vertical lines in the upper part of FIGS. 5 and 6 represents an input vertical synchronization signal and each of the vertical lines in the lower part represents a display vertical synchronization signal. In the examples in FIGS. 5 and 6, the delay time between the input of a frame into the buffer 2 and the display of the frame on the display apparatus is equivalent to 1 frame, which is the shortest possible delay.

In the present embodiment, as in the invention in Document 1, a display standard vertical synchronization signal Vbase is used as the display vertical synchronization signal immediately after a synchronization request. In the present embodiment, a phase difference between the input vertical synchronization signal and the display vertical synchronization signal (hereinafter sometimes simply referred to as phase difference) is detected and the cycle period of the display vertical synchronization signal is corrected within a compensation period to reduce the detected phase difference.

An input video with an input vertical synchronization period that exceeds a compensation period cannot be displayed on the display apparatus. In other words, the difference between an input vertical synchronization cycle period and a display vertical synchronization cycle period of a video signal that can be displayed on the display apparatus is shorter than the compensation period. Accordingly, a phase difference can be reduced by correcting the display vertical synchronization signal period within the compensation period.

For a video signal that can be displayed on the display apparatus, setting the cycle period of the display vertical synchronization signal to the minimum vertical synchronization period changes the phase so that the display vertical synchronization signal advances with respect to the input vertical synchronization signal; on the other hand, setting the cycle period of the display vertical synchronization signal to the maximum vertical synchronization period changes the phase so that the display vertical synchronization signal delays with respect to the input vertical synchronization signal.

In the present embodiment, the direction in which the cycle period of the display vertical synchronization signal is corrected is determined such that the display vertical synchronization signal coincides with the input vertical synchronization signal that is the closest in time, in order to reduce the phase difference in a short time.

FIG. 5 illustrates an example in which the phase of the display vertical synchronization signal is closer in time to the earlier one of two successive input vertical synchronization signals. That is, D<Vin/2, where D is phase difference and Vin is an input vertical synchronization period which varies in a certain range. In this case, the cycle period of the display vertical synchronization signal is reduced shorter than the cycle period of the input vertical synchronization signal within the compensation period, thereby reducing the phase difference. For example, when the phase difference is greater than (Vbase−Vsht), the cycle period of the display vertical synchronization signal is set to the minimum vertical synchronization period Vsht. When the phase difference is smaller than (Vbase−Vsht), the cycle period of the display vertical synchronization signal is set to a period equivalent to the phase difference.

In the example in FIG. 5, the phase difference upon a synchronization request is D0, the phase difference in a next display vertical synchronization period is D1 and D1>(Vbase−Vsht). For a next display vertical synchronization period, the cycle period of the display vertical synchronization signal is set to the minimum vertical synchronization period Vsht. The result is D2<D1 . From then on, the cycle period of the display vertical synchronization signal is set to the minimum vertical synchronization period Vsht in every vertical synchronization period until the phase difference becomes smaller than (Vbase−Vsht).

In the example in FIG. 5, D5<(Vbase−Vsht). Accordingly, the cycle period of the display vertical synchronization signal is set to (Vbase−d5), where d5=D5. This can reduce the phase difference between the input vertical synchronization signal and the display vertical synchronization signal to a sufficiently small value.

Here, the phases of the input vertical synchronization signal and the display vertical synchronization signal can be matched by setting d to a value equal to phase difference D5+(Vin−Vbase). However, the phase difference does not need to be reduced to 0 in the present embodiment; it is only necessary that the start point of the input vertical synchronization fall within the compensation period.

As will be described later, the phase difference between the input vertical synchronization signal and the display vertical synchronization signal is obtained in units of line cycle periods in the present embodiment. Accordingly, phase difference correction is performed in units of line cycle periods. In the example in FIG. 5, the difference between the cycle period of the input vertical synchronization signal and the cycle period of the display reference vertical synchronization signal is less than 1 line. Accordingly, the phase difference between the input vertical synchronization signal and the display vertical synchronization signal can be reduced to less than 1 line. After the phase difference reduces to less than 1 line, the phase difference accumulates in a certain period of time and a phase difference D6 of 1 line is detected. The phase difference can be reduced to less than 1 line by correcting the cycle period of the display vertical synchronizations signal in a next vertical synchronization period by 1 line. While the cycle period of display vertical synchronization signal is set to (Vbase−1) since input vertical synchronization frequency>display reference vertical synchronization frequency in the example in FIG. 5, the cycle period of the display vertical synchronization signal may be set to (Vbase+1) if (input vertical synchronization frequency)<(display reference vertical synchronization frequency).

While the amount of delay is equal to 1 frame in the example in FIG. 5, it will be apparent that the foregoing also applies to a 2-frame delay.

FIG. 6 illustrates an example in which the phase of the display vertical synchronization signal is closer in time to the later one of two successive input vertical synchronization signals. That is, D>Vin/2. In this case, the cycle period of a display vertical synchronization signal is increased to a relatively large value within a compensation period to cause the phase difference to approach Vin. That is, the phase difference between the input vertical synchronization signal and the display vertical synchronization signal with respect to the display vertical synchronization signal, (Vin−D), is caused to approach 0.

If |Vin−D| is greater than |Vbase−Vlng|, the cycle period of the display vertical synchronization signal is set to the maximum vertical synchronization period Vlng. If the phase difference is smaller than (Vbase−Vlng), the cycle period of the display vertical synchronization signal is set to a period equivalent to the phase difference.

In the example in FIG. 6, the phase difference upon issuance of a synchronization request is D0. Since $|Vin-D0|>|Vbase-Vlng|$, the cycle period of the display vertical synchronization signal is set to the maximum vertical synchronization period Vlng in a next vertical synchronization period. The result is $|Vin-D1|<|Vin-D0|$. Since $|Vin-D1|>|Vbase-Vlng|$, the cycle period of a next display vertical synchronization signal is set to the maximum vertical synchronization period Vlng. The result is $|Vin-D2|<|Vin-D1|$. From then on, the cycle period of the display vertical synchronization signal is set to the maximum vertical synchronization period Vlng in every vertical synchronization period until $|Vin-D|$ becomes smaller than $|Vbase-Vlng|$.

In the example in FIG. 6, $|Vlng-D4|<|Vbase-Vlng|$. Accordingly, the cycle period of the display vertical synchronization signal is set to (Vbase+d), where $d=|Vin-D4|$. Thus, the phase of the input vertical synchronization signal and the phase of the display vertical synchronization signal can be caused to approach each other.

Since the phase difference is corrected on a line-cycle-period by line-cycle-period basis, the phase difference accumulates in a certain period of time after synchronization, and a phase difference D5 of 1 line is detected in the example in FIG. 6. The phase difference can be reduced to less than 1 line by correcting the cycle period of the display vertical synchronization signal in a next vertical synchronization period by 1 line. While the cycle period of the display vertical synchronization signal is set to (Vbase−1) in the example in FIG. 6 since input vertical synchronization frequency>display reference vertical synchronization frequency, the cycle period of the display vertical synchronization signal may be set to (Vbase+1) if input vertical synchronization frequency<display reference vertical synchronization frequency.

While the amount of delay is equal to 1 frame in the example in FIG. 6, it will be apparent that the foregoing also applies to a 2-frame delay.

In FIG. 1, a display reference vertical synchronization signal Vbase is input at an input terminal 11, the value Vsht of a minimum vertical synchronization period Vsht is input at an input terminal 12, and the value Vlng of a maximum vertical synchronization period Vlng is input at an input terminal 13. An input vertical synchronization signal Vin is provided to an input terminal 14.

A selecting section 50 includes a selector 51 to which the display reference vertical synchronization signal Vbase is provided from the input terminal 11 and a corrected display vertical synchronization signal Vdout, which will be described later, is provided from a vertical synchronization correction control section 40. The selector 51 is controlled by a synchronization control signal. When an instruction to synchronize is not issued, the selector 51 selects the display reference vertical synchronization signal Vbase; when an instruction to synchronize is issued, the selector 51 selects the corrected display vertical synchronization signal Vdout and outputs it as a display vertical synchronization signal Vout to an output terminal 15. The display vertical synchronization signal Vout is used as a vertical synchronization signal for display on the display apparatus.

A phase detecting section 30 includes a phase difference detecting counter 31 and a flip-flop 32 and obtains a phase difference D between the display vertical synchronization signal Vout and the input vertical synchronization signal Vin. The input vertical synchronization signal Vin is input into the phase difference detecting counter 31 as a reset signal Reset. While being reset by the input vertical synchronization signal Vin, the counter 31 counts up every time a display horizontal synchronization signal appears. That is, the output of the phase difference detecting counter 31 represents the length of a period from the start point of input vertical synchronization measured in units of line cycle periods.

The output from the phase difference detecting counter 31 is provided to the flip-flop 32. The flip-flop 32 takes in the count value of the phase difference detecting counter 31 in response to the display vertical synchronization signal Vout and outputs the count value. Specifically, the flip-flop 32 outputs a difference in period from the start point of input vertical synchronization to the start point of display vertical synchronization, measured in units of line cycle periods, that is, a phase difference D between an input vertical synchronization signal and a display vertical synchronization signal with respect to the input vertical synchronization signal. Information representing the phase difference D is provided to the vertical synchronization correction control section 40.

A synchronization compensation period generating section 20 includes a synchronization compensation period generating counter 21 and comparators 22 and 23 and obtains the beginning and end of a compensation period, that is, timing of the end point of a minimum vertical synchronization period and the timing of the end point of a maximum vertical synchronization period. The display vertical synchronization signal Vout is input into the synchronization compensation period generating counter 21 as a reset signal Reset. While being reset by the display vertical synchronization signal Vout, the synchronization compensation period generating counter 21 counts up every time a display horizontal synchronization signal appears.

The output from the synchronization compensation period generating counter 21 is provided to the comparators 22 and 23. The comparator 22 outputs an assert signal at the timing at which the output from the synchronization compensation period generating counter 21 reaches the value Vsht of the minimum vertical synchronization period Vsht. Similarly, the comparator 23 outputs an assert signal at the timing at which the output from the synchronization compensation period generating counter 21 reaches the value Vlng of the maximum vertical synchronization period Vlng. The assert signals from the comparators 22 and 23 are provided to the vertical synchronization correction control section 40.

The vertical synchronization correction control section 40 includes a vertical synchronization correction amount calculating section 41 and an adder 42. The vertical synchronization correction amount calculating section 41 is provided with the display reference vertical synchronization signal Vbase from the input terminal 11, the two assert signals from the synchronization compensation period generating section 20, the phase difference D from the phase detecting section 30, and the display vertical synchronization signal Vout.

Immediately after a synchronization request, the vertical synchronization correction amount calculating section 41 determines, on the basis of the phase difference D between the input vertical synchronization signal and the display vertical synchronization signal with respect to the input vertical synchronization signal, whether to make a correction to lengthen the cycle period of the display vertical synchronization signal or to make a correction so as to shorten the cycle period of the display vertical synchronization signal. The vertical synchronization correction amount calculating section 41 receives the input vertical synchronization signal Vin and obtains the cycle period Vin of the input vertical synchronization signal Vin. The vertical synchronization correction amount calculating section 41 then compares in magnitude the phase difference D from the phase detecting section 30 with ½ of Vin. If the phase difference D is smaller than ½ of the cycle period Vin of the input vertical synchronization signal, the vertical synchronization correction amount calculating section 41 obtains a correction amount d such that the phase difference D is reduced; if the phase difference D is greater than ½ of the cycle period of the input vertical synchronization signal, the vertical synchronization correction amount calculating section 41 obtains a correction amount d such that the phase difference D is increased, that is, a $|Vin-D|$ is reduced. This can cause the phase of the display vertical synchronization signal to approach the phase of the input vertical synchronization signal in a short time.

Specifically, if $D<Vin/2$ where Vin is the cycle period of the input vertical synchronization signal Vin, the sign of the correction amount d will be negative so as to shorten the cycle period of the display vertical synchronization signal. On the other hand, if $D \geqq Vin/2$, the sign will be positive. Alternatively, the sign of the correction amount d may be negative if $D \leqq Vin/2$ and positive if $D>Vin/2$.

The vertical synchronization correction amount calculating section 41 obtains the correction amount d based on the magnitude of the phase difference D and outputs the correction amount d to the adder 42. The display reference vertical synchronization signal Vbase is also provided to the adder 42. The adder 42 corrects the cycle period of the display reference vertical synchronization signal Vbase by the correction amount d and outputs a corrected display vertical synchronization signal Vdout to the selecting section 50. When a synchronization instruction is issued, the selecting section 50 outputs the corrected display vertical synchronization signal Vdout provided from the adder 42 through the output terminal 15 as a display vertical synchronization signal Vout.

The vertical synchronization correction amount calculating section 41 uses a correction amount d as large as possible in order to cause the phase of the display vertical synchronization signal to approach the phase of the input vertical synchronization signal in a short time. First, the vertical synchronization correction amount calculating section 41 obtains $|Vbase-Vsht|$ and $|Vbase-Vlng|$ from the assert signals from the synchronization compensation period generating section 20 and the display reference vertical synchronization signal Vbase. Then, the vertical synchronization amount calculating section 41 compares these values with the phase difference D or $Vin-D$.

To advance the phase of the display vertical synchronization signal, that is, to shorten the cycle period of the display vertical synchronization signal, the magnitude of the correction amount d is set to a maximum correction amount $d=-|Vbase-Vsht|$, for example, when the phase difference D is $D \geqq |Vbase-Vsht|$. The result is: $Vout=Vsht$.

When the phase difference D is $D<|V\ base-Vsht|$, the correction amount d is set to $d=-D$. The result is: $Vout=Vbase-D$.

On the other hand, to delay the phase of the display vertical synchronization signal, that is, to lengthen the cycle period of the display vertical synchronization signal, the magnitude of the correction amount is set to a maximum correction amount $d=|Vbase-Vlng|$, for example, when $|Vin-D| \geqq |Vbase-Vlng|$. The result is: $Vout=Vlng$.

When $|Vin-D|<|Vbase-Vlng|$, the correction amount d is set to $d=|Vin-D|$. The result is $Vout=Vbase+|Vin-D|$.

The inequality signs in the expressions given above may be replaced.

Operation of the embodiment configured as described above will be described below.

It is assumed here that the selecting section 50 selects a display reference vertical synchronization signal Vbase and outputs the signal Vbase as a display vertical synchronization signal Vout under the control of a synchronization control signal. Here, it is also assumed that a synchronization request is issued due to channel switching, for example. An input vertical synchronization signal Vin is input into the synchronization signal control circuit 10 through the input terminal 14. The input vertical synchronization signal Vin is provided to the phase detecting section 30. The phase detecting section 30 is also provided with the display vertical synchronization signal Vout. The phase detecting section 30 obtains a phase difference D between the input vertical synchronization signal and the display vertical synchronization signal with respect to the input vertical synchronization signal Vin and outputs the phase difference D to the vertical synchronization correction amount calculating section 41.

On the other hand, the value Vsht of a minimum vertical synchronization period and the value Vlng of a maximum vertical synchronization period are provided to the synchronization compensation period generating section 20. The synchronization compensation period generating section 20 generates assert signals at the timing of the end of the minimum vertical synchronization period and at the timing of the end of the maximum vertical synchronization period. The assert signals and the display reference vertical synchronization signal Vbase are provided to the vertical synchronization correction amount calculating section 41.

The vertical synchronization correction amount calculating section 41 is also provided with the input vertical synchronization signal Vin. The vertical synchronization correction amount calculating section 41 compares the phase difference D with a period $Vin/2$ to determine to which of successive input vertical synchronization signals the display vertical synchronization signal is closer. If the display vertical synchronization signal is closer to the earlier one of the input vertical synchronization signals (the example in FIG. 5), the vertical synchronization correction amount calculating section 41 compares the phase difference D with $|Vbase-Vsht|$ to calculate a correction amount d. If the display vertical synchronization signal is closer to the later one of the input vertical synchronization signals (the example in FIG. 6), the vertical synchronization correction amount calculating section 41 compares $Vin-D$ with $|Vbase-Vlng|$ to calculate a correction amount d.

For example, in the example in FIG. 5, if the phase difference D obtained at each vertical synchronization is $D \geqq |Vbase-Vsht|$, the vertical synchronization correction amount calculating section 41 calculates the correction amount $d=-|Vbase-Vsht|$. The result is $Vout=Vsht$ and the phase of the display vertical synchronization signal advances. When the phase difference D becomes $D<|Vbase-Vsht|$ as a result, the vertical synchronization correction amount calculating section 41 obtains the correction amount $d=-D$. The result is $Vout=Vbase-D$ and the phase of the display vertical synchronization signal sufficiently approaches the phase of the input vertical synchronization signal.

In the example in FIG. 6, if the phase difference D obtained at each vertical synchronization satisfies $|Vin-D| \geqq |Vbase-Vsht|$, the vertical synchronization correction amount calculating section 41 obtains the correction amount $d=-|Vbase-Vlng|$. The result is that $Vout=Vlng$ and the phase of the display vertical synchronization signal delays. When $|Vin-D|$ becomes smaller than $|Vbase-Vsht|$ as a result, the vertical synchronization correction amount calculating section 41 obtains the correction amount d to $d=|Vin-D|$. The result is $Vout=Vbase+|Vin-D|$ and the phase of the display vertical synchronization signal sufficiently approaches the phase of the input vertical synchronization signal.

As has been described above, according to the present embodiment, the phase difference between the input vertical synchronization signal and the display vertical synchronization signal is detected and the cycle period of the display vertical synchronization signal is corrected within a compensation period so as to reduce the phase difference. This enables input video to be displayed without image corruption and prevents repeats and skips when a video signal that is not in synchronization with display synchronization is input. Furthermore, the phase difference between an input vertical synchronization signal and a display vertical synchronization signal can be reduced to prevent an increase in delay time of displayed video with respect to input video.

According to the present embodiment, while the direction in which the cycle period of the display vertical synchronization signal is corrected is determined on the basis of an initial phase difference so that the display vertical synchronization signal coincides with the input vertical synchronization signal that is the closest in time, correction may be made such that the cycle period of the display vertical synchronization is always shortened or lengthened regardless of the magnitude of the initial phase difference.

(Second Embodiment)

Figure 7:
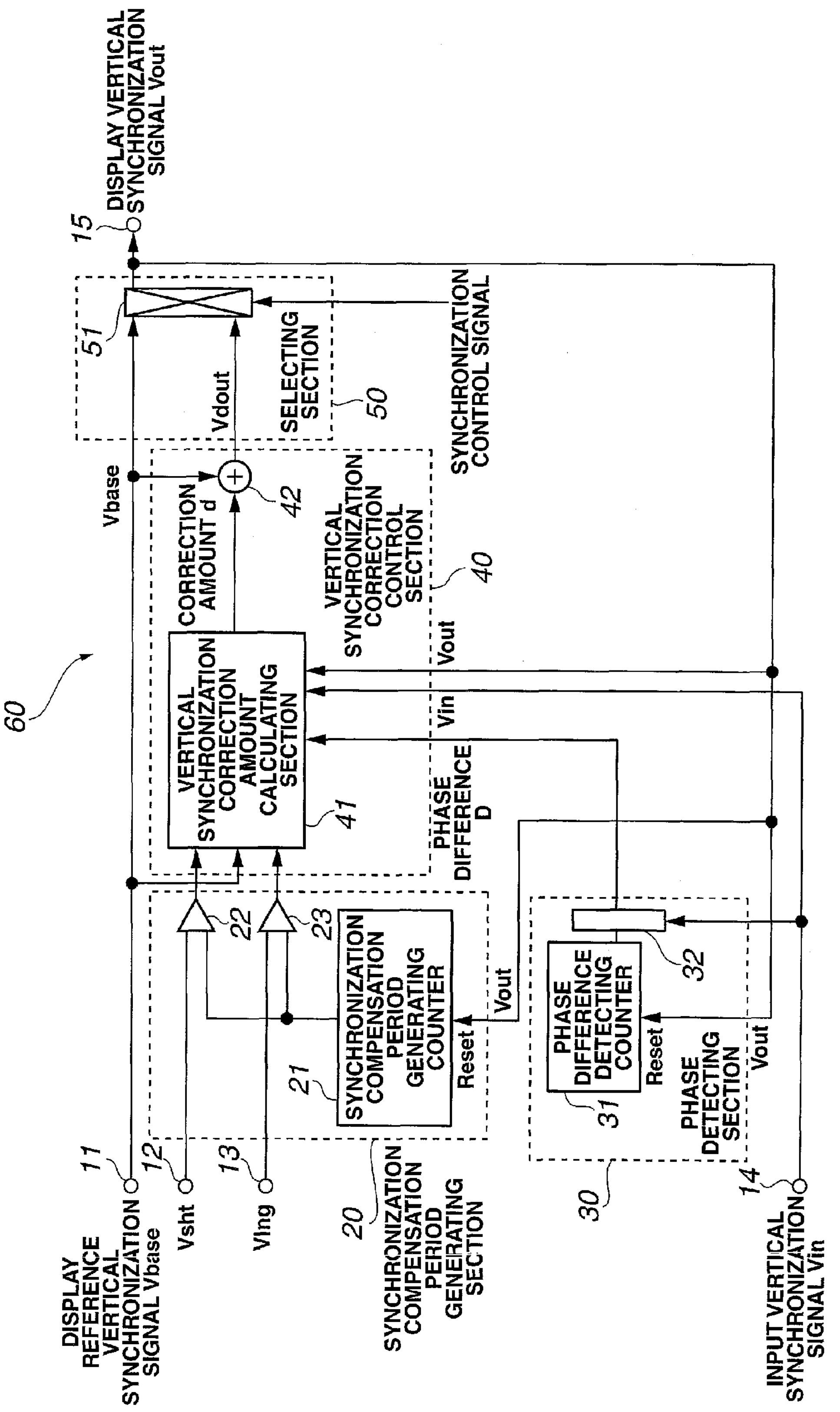
FIG. 7 is a block diagram illustrating a second embodiment of the present invention.

FIG. 7 is a block diagram illustrating a second embodiment of the present invention. The same components in FIG. 7 as those in FIG. 1 are labeled the same reference numerals and the description of such components will be omitted.

A synchronization signal control circuit 60 according to the present embodiment is the same as the synchronization signal control circuit 10 in FIG. 1 with the only difference that the synchronization signal control circuit 60 obtains a phase difference between an input vertical synchronization signal and a display vertical synchronization signal with respect to the display vertical synchronization signal.

In FIG. 7, an input vertical synchronization signal Vin from an input terminal 14 is provided to a flip-flop 32 of a phase detecting section 30 and a vertical synchronization correction amount calculating section 41 of a vertical synchronization correction control section 40. A display vertical synchronization signal Vout is provided to a phase difference detecting counter 31 of the phase detecting section 30, a synchronization compensation period generating counter 21 of a synchronization compensation period generating section 20, and the vertical synchronization correction amount calculating section 41 of the vertical synchronization correction control section 40.

While being reset by the display vertical synchronization signal Vout, the phase difference detecting counter 31 of the phase detecting section 30 counts up every time a display horizontal synchronization signal appears. That is, the output from the phase difference detecting counter 31 indicates the period elapsed from the start point of display vertical synchronization, measured in units of line cycle periods.

The output from the phase difference detecting counter 31 is provided to the flip-flop 32. The flip-flop 32 takes in and outputs the count value of the phase difference detecting counter 31 in response to the input vertical synchronization signal Vin. Specifically, the flip-flop 32 outputs a difference in period from the start point of display vertical synchronization to the start point of input vertical synchronization, measured in units of line cycle periods, that is, a phase difference D between an input vertical synchronization signal and a display vertical synchronization signal with respect to the display vertical synchronization signal. Information representing the phase difference D is provided to the vertical synchronization correction control section 40.

Immediately after a synchronization request, the vertical synchronization correction amount calculating section 41 determines, on the basis of the phase difference D between the input vertical synchronization signal and the display vertical synchronization signal with respect to the display vertical synchronization signal, whether to make a correction to lengthen the cycle period of the display vertical synchronization signal or to make a correction so as to shorten the cycle period of the display vertical synchronization signal. The vertical synchronization correction amount calculating section 41 receives the input vertical synchronization signal Vin and obtains the cycle period Vin of the input vertical synchronization signal Vin. The vertical synchronization correction amount calculating section 41 then compares in magnitude the phase difference D from the phase detecting section 30 with ½ of Vin. If the phase difference D is smaller than ½ of the cycle period Vin of the input vertical synchronization signal (in a case similar to the example in FIG. 6), the vertical synchronization correction amount calculating section 41 obtains a correction amount d such that the phase difference D increases; if the phase difference D is greater than ½ of the cycle period of the input vertical synchronization signal (in a case similar to the example in FIG. 5), the vertical synchronization correction amount calculating section 41 obtains a correction amount d such that the phase difference D decreases, that is, a $|Vin-D|$ decreases. This can cause the phase of the display vertical synchronization signal to approach the phase of the input vertical synchronization signal in a short time.

Specifically, if $D<Vin/2$ (in a case similar to the example in FIG. 6), the sign of the correction amount d will be positive so as to lengthen the cycle period of the display vertical synchronization signal, where Vin is the cycle period of the input vertical synchronization signal Vin. On the other hand, if $D \geqq Vin/2$ (in a case similar to the example in FIG. 5), the sign will be negative. Alternatively, the sign of the correction amount d may be positive if $D \leqq Vin/2$ and negative if $D>Vin/2$.

To advance the phase of the display vertical synchronization signal, that is, to shorten the cycle period of the display vertical synchronization signal, the magnitude of the correction amount is set to a maximum correction amount $d=-|Vbase-Vsht|$, for example, when $|Vin-D| \geqq |Vbase-Vsht|$. The result is $Vout=Vsht$.

When $|Vin-D|<|Vbase-Vsht|$, the correction amount d is set to $d=|Vin-D|$. The result is $Vout=Vbase-|Vin-D|$.

On the other hand, to delay the phase of the display vertical synchronization signal, that is, to lengthen the cycle period of the display vertical synchronization signal, the magnitude of the correction amount is set to a maximum correction amount $d=|Vbase-Vlng|$, for example, when $D \geqq |Vbase-Vlng|$. The result is $Vout=Vlng$.

When $D<|Vbase-Vlng|$, the correction amount d is set to $d=-D$. The result is $Vout=Vbase-D$.

The inequality signs in the expressions given above may be replaced.

The operation of the embodiment configured as described above is the same as that in the first embodiment with the only difference that the phase difference between the input vertical synchronization signal and the display vertical synchronization signal is based on the display vertical synchronization signal. In the present embodiment, as in the first embodiment, synchronization is performed while the cycle period of the display vertical synchronization signal is corrected so as to reduce the phase difference.

As described above, the present embodiment has the same advantageous effects as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein:

when a period based on the phase difference is greater than a period equivalent to a difference between a reference vertical synchronization period within the compensation period range and the minimum or maximum vertical synchronization period, the vertical synchronization correction control section sets the cycle period of the display vertical synchronization signal to the minimum vertical synchronization period or the maximum vertical synchronization period.

2. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein:

when a period based on the phase difference is smaller than a period equivalent to the difference between a reference vertical synchronization period within the compensation period range and the minimum or maximum vertical synchronization period, the vertical synchronization correction control section sets the cycle period of the display vertical synchronization signal to the period based on the phase difference.

3. The synchronization signal control circuit according to claim 2, wherein:

when the detected phase difference is 0, the vertical synchronization correction control section sets the cycle period of the display vertical synchronization signal to the reference vertical synchronization period.

4. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein:

the vertical synchronization correction control section corrects the cycle period of the display vertical synchronization signal within the compensation period range so as to cause a phase of the display vertical synchronization signal to approach a phase of an earlier one of the input vertical synchronization signals or a later one of the input vertical synchronization signals, whichever is closer to the phase of the display vertical synchronization signal, and wherein:

when a period based on the phase difference is greater than a period equivalent to a difference between the reference vertical synchronization period within the compensation period range and the minimum or maximum vertical synchronization period, the vertical synchronization correction control section sets the cycle period of the display vertical synchronization signal to the minimum vertical synchronization period or the maximum vertical synchronization period.

5. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein:

the vertical synchronization correction control section corrects the cycle period of the display vertical synchronization signal within the compensation period range so as to cause a phase of the display vertical synchronization signal to approach a phase of an earlier one of the input vertical synchronization signals or a later one of the input vertical synchronization signals, whichever is closer to the phase of the display vertical synchronization signal, and wherein:

when the period based on the phase difference is smaller than the period equivalent to the difference between a reference vertical synchronization period within the compensation period range and the minimum or maximum vertical synchronization period, the vertical synchronization correction control section sets the cycle period of the display vertical synchronization signal to the period based on the phase difference.

6. The synchronization signal control circuit according to claim 5, wherein:

when the detected phase difference is 0, the vertical synchronization correction control section sets the cycle period of the display vertical synchronization signal to the reference vertical synchronization period.

7. The synchronization signal control circuit according to claim 5, wherein:

the phase difference detecting section counts display horizontal synchronization signals used in the display section to obtain the phase difference measured in units of the display horizontal synchronization signal cycle periods; and the vertical synchronization correction control section corrects the cycle period of the display vertical synchronization signal in units of the display horizontal synchronization signal cycle periods.

8. The synchronization signal control circuit according to claim 7, wherein the phase difference detecting section obtains the phase difference in a cycle period of the display vertical synchronization signal.

9. The synchronization signal control circuit according to claim 7, wherein the phase difference detecting section obtains the phase difference in a cycle period of the input vertical synchronization signal.

10. The synchronization signal control circuit according to claim 8, wherein:

the phase difference detecting section comprises:

a counter configured to be reset by the input vertical synchronization signal and count the display horizontal synchronization signals; and a flip-flop configured to output a count value of the counter at a timing of the display vertical synchronization signal; and the phase difference detecting section detects the phase difference in units of line cycle periods.

11. The synchronization signal control circuit according to claim 9, wherein:

the phase difference detecting section comprises:

a counter configured to be reset by the display vertical synchronization signal and count the display horizontal synchronization signals; and a flip-flop configured to output a count value of the counter at a timing of the input vertical synchronization signal; and the phase difference detecting section detects the phase difference in units of line cycle periods.

12. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein the phase difference detecting section counts display horizontal synchronization signals used in the display section to obtain the phase difference measured in units of the display horizontal synchronization signal cycle periods; and the vertical synchronization correction control section corrects the cycle period of the display vertical synchronization signal in units of the display horizontal synchronization signal cycle periods, and wherein:

the vertical synchronization correction control section comprises:

a compensation period counter configured to be reset by the display vertical synchronization signal and count the display horizontal synchronization signals; and a comparator configured to compare a count value of the compensation period counter with a value corresponding to the minimum vertical synchronization period and a value corresponding to the maximum vertical synchronization period and output a signal indicating the timing of an end of the minimum vertical synchronization period and a signal indicating the timing of an end of the maximum vertical synchronization period.

13. A synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal; and a vertical synchronization correction control section configured to correct a cycle period of the display vertical synchronization signal within the compensation period range so as to reduce the phase difference, wherein the phase difference detecting section counts display horizontal synchronization signals used in the display section to obtain the phase difference measured in units of the display horizontal synchronization signal cycle periods; and the vertical synchronization correction control section corrects the cycle period of the display vertical synchronization signal in units of the display horizontal synchronization signal cycle periods, wherein the vertical synchronization correction control section determines whether to increase or reduce the cycle period of the display vertical synchronization signal so as to reduce the phase difference, on the basis of the comparison between the phase difference and the cycle period of the input vertical synchronization signal, and determines a correction amount of the cycle period of the display vertical synchronization signal on the basis of whether or not the period based on the phase difference is greater than the period equivalent to the difference between the reference vertical synchronization period within the compensation period range and the minimum or maximum vertical synchronization period.

14. The synchronization signal control circuit according to claim 13, wherein the vertical synchronization correction control section sets, as a correction amount of the cycle period of the display vertical synchronization signal, a period equivalent to a difference between the reference vertical synchronization period and the minimum vertical synchronization period or a period equivalent to the difference between the reference vertical synchronization period and the maximum vertical synchronization period.

15. A display apparatus comprising:

a synchronization signal control circuit outputting a display vertical synchronization signal used for displaying an input video signal to a display section capable of providing a display based on the input video signal when a vertical synchronization period of the input video signal is within a compensation period range between a minimum vertical synchronization period and a maximum vertical synchronization period, the synchronization signal control circuit comprising:

a phase difference detecting section configured to detect a phase difference between an input vertical synchronization signal based on the input video signal and the display vertical synchronization signal, a vertical synchronization correction control section configured to correct a cycle period of the display vertical synchronization signal within the compensation period so as to reduce the phase difference, and a control section configured to control the synchronization signal control circuit, read a video signal stored in a buffer with a minimum frame delay and provide the video signal to the display section as the input video signal, wherein:

the vertical synchronization correction control section corrects the cycle period of the display vertical synchronization signal within the compensation period range so as to cause a phase of the display vertical synchronization signal to approach a phase of an earlier one of the input vertical synchronization signals or a later one of the input vertical synchronization signals, whichever is closer to the phase of the display vertical synchronization signal, and the vertical synchronization correction control section sets, as a correction amount of the cycle period of the display vertical synchronization signal, a period equivalent to a difference between the reference vertical synchronization period and the minimum vertical synchronization period or a period equivalent to the difference between the reference vertical synchronization period and the maximum vertical synchronization period.

16. The display apparatus according to claim 15, wherein:

the phase difference detecting section counts display horizontal synchronization signals used in the display section to obtain the phase difference measured in units of the display horizontal synchronization signal cycle periods; and the vertical synchronization correction control section corrects the cycle period of the display vertical synchronization signal in units of the display horizontal synchronization signal cycle periods.

* * * * *